United States Patent
Grigg et al.

(10) Patent No.: US 9,317,674 B2
(45) Date of Patent: Apr. 19, 2016

(54) USER AUTHENTICATION BASED ON FOB/INDICIA SCAN

(71) Applicant: BANK OF AMERICA CORPORATION, Charlotte, NC (US)

(72) Inventors: David M. Grigg, Rock Hill, SC (US); Charles Jason Burrell, Middleburg, FL (US); Peter John Bertanzetti, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 141 days.

(21) Appl. No.: 14/175,615

(22) Filed: Feb. 7, 2014

(65) Prior Publication Data
US 2015/0227726 A1    Aug. 13, 2015

(51) Int. Cl.
*G06F 21/31* (2013.01)
*G06F 21/62* (2013.01)
*H04L 29/06* (2006.01)

(52) U.S. Cl.
CPC .............. *G06F 21/31* (2013.01); *G06F 21/629* (2013.01); *H04L 63/083* (2013.01); *H04L 63/0861* (2013.01); *G06F 2221/2113* (2013.01); *G06F 2221/2149* (2013.01)

(58) Field of Classification Search
CPC ..... G06F 21/445; G06F 21/62; G06F 21/316; G06F 21/31; G06F 7/04; H04L 63/126; H04L 67/02; H04L 63/1483; H04L 63/10; H04L 63/0823; H04L 63/0876; H04L 63/105; H04L 9/3234; H04L 9/3263
USPC .............. 726/4–5, 7, 19–20, 27–28; 713/182; 705/16, 50; 707/770; 455/41.1
See application file for complete search history.

(56) References Cited

U.S. PATENT DOCUMENTS

| | | |
|---|---|---|
| 5,437,346 A | 8/1995 | Dumont |
| 6,256,670 B1 | 7/2001 | Davies |
| 7,111,323 B1 | 9/2006 | Bhatia et al. |
| 7,231,202 B2 | 6/2007 | Natsuno |
| 7,239,226 B2 | 7/2007 | Berardi et al. |
| 7,373,515 B2 | 5/2008 | Owen et al. |
| 7,472,081 B1 | 12/2008 | Cason |

(Continued)

OTHER PUBLICATIONS

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

(Continued)

*Primary Examiner* — Thanhnga B Truong
(74) *Attorney, Agent, or Firm* — Michael A. Springs; Moore & Van Allen PLLC; Peter B. Stewart

(57) ABSTRACT

Embodiments of the invention are directed to systems, methods and computer program products for receiving a request from a user for access to at least one function associated with a first application; determining that access to at least one function requires user authentication; initiating sensing of an authentication validating carrier comprising a first credential; determining the first credential based at least in part on the sensed authentication validating carrier; validating the first credential, thereby resulting in a first successful user authentication; and granting access to at least one function associated with the first application based on the validation of the first successful user authentication.

18 Claims, 5 Drawing Sheets

(56) References Cited

U.S. PATENT DOCUMENTS

| | | |
|---|---|---|
| 7,529,741 B2 | 5/2009 | Aravamudan et al. |
| 7,546,276 B2 | 6/2009 | Randle et al. |
| 7,697,920 B1 | 4/2010 | McClain |
| 7,783,281 B1 | 8/2010 | Cook et al. |
| 7,930,264 B2 | 4/2011 | Geppert |
| 7,988,045 B2 | 8/2011 | Connell, II et al. |
| 8,012,219 B2 | 9/2011 | Mendez et al. |
| 8,156,335 B2 | 4/2012 | Lin |
| 8,165,945 B2 | 4/2012 | Collins et al. |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,332,272 B2 | 12/2012 | Fisher |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,412,626 B2 | 4/2013 | Hirson et al. |
| 8,423,466 B2 | 4/2013 | Lanc |
| 8,442,915 B2 | 5/2013 | Takatori et al. |
| 8,483,663 B1 | 7/2013 | Jones |
| 8,485,438 B2 | 7/2013 | Dollard |
| 8,601,602 B1 | 12/2013 | Zheng |
| 8,644,506 B2 | 2/2014 | Zellner |
| 8,660,358 B1 | 2/2014 | Bergboer et al. |
| 8,683,571 B2 | 3/2014 | Zapata et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,973,102 B2 | 3/2015 | Jakobsson |
| 2002/0077978 A1 | 6/2002 | O'Leary et al. |
| 2002/0157029 A1 | 10/2002 | French et al. |
| 2002/0174073 A1 | 11/2002 | Nordman et al. |
| 2003/0065805 A1 | 4/2003 | Barnes, Jr. |
| 2006/0030333 A1 | 2/2006 | Ward et al. |
| 2007/0094152 A1 | 4/2007 | Bauman et al. |
| 2007/0100773 A1 | 5/2007 | Wallach |
| 2007/0156842 A1 | 7/2007 | Vermeulen et al. |
| 2007/0168677 A1 | 7/2007 | Kudo et al. |
| 2007/0219984 A1 | 9/2007 | Aravamudan et al. |
| 2007/0250920 A1 | 10/2007 | Lindsay |
| 2008/0293397 A1 | 11/2008 | Gajdos et al. |
| 2009/0019534 A1 | 1/2009 | Bakshi et al. |
| 2009/0100529 A1 | 4/2009 | Livnat et al. |
| 2009/0150286 A1 | 6/2009 | Barton |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0254975 A1 | 10/2009 | Turnbull et al. |
| 2010/0100897 A1 | 4/2010 | Manuel-Devadoss |
| 2010/0122333 A1 | 5/2010 | Noe |
| 2010/0257099 A1* | 10/2010 | Bonalle .................. G06Q 20/00 705/50 |
| 2010/0330958 A1 | 12/2010 | Corda et al. |
| 2011/0016534 A1 | 1/2011 | Jakobsson et al. |
| 2011/0137804 A1 | 6/2011 | Peterson |
| 2011/0142234 A1 | 6/2011 | Rogers |
| 2011/0159846 A1 | 6/2011 | Kemshall |
| 2011/0167440 A1 | 7/2011 | Greenfield |
| 2011/0208601 A1 | 8/2011 | Ferguson et al. |
| 2011/0270618 A1 | 11/2011 | Banerjee et al. |
| 2011/0320296 A1 | 12/2011 | Edwards |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0137340 A1 | 5/2012 | Jakobsson et al. |
| 2012/0144468 A1 | 6/2012 | Pratt et al. |
| 2012/0160912 A1 | 6/2012 | Laracey |
| 2012/0173551 A1 | 7/2012 | Haddorp et al. |
| 2012/0174237 A1 | 7/2012 | Krzyzanowski |
| 2012/0197743 A1 | 8/2012 | Grigg et al. |
| 2012/0230539 A1 | 9/2012 | Calman et al. |
| 2012/0239576 A1 | 9/2012 | Rose et al. |
| 2012/0254941 A1 | 10/2012 | Levien et al. |
| 2012/0254943 A1 | 10/2012 | Li |
| 2012/0265585 A1 | 10/2012 | Muirbrook et al. |
| 2012/0300938 A1 | 11/2012 | Kean et al. |
| 2012/0316963 A1 | 12/2012 | Moshfeghi |
| 2013/0007874 A1 | 1/2013 | Purvis |
| 2013/0013498 A1 | 1/2013 | Fisher et al. |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0042314 A1 | 2/2013 | Kelley |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0111208 A1 | 5/2013 | Sabin et al. |
| 2013/0143621 A1 | 6/2013 | Kumaran |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0188485 A1 | 7/2013 | Midani et al. |
| 2013/0198056 A1 | 8/2013 | Aldrey et al. |
| 2013/0219454 A1 | 8/2013 | Hewinson |
| 2013/0267204 A1 | 10/2013 | Schultz et al. |
| 2013/0290361 A1 | 10/2013 | Anderson et al. |
| 2013/0318627 A1* | 11/2013 | Lundkvist ............. G06F 21/445 726/27 |
| 2014/0130127 A1 | 5/2014 | Toole et al. |
| 2014/0173704 A1 | 6/2014 | Adams et al. |
| 2014/0187148 A1* | 7/2014 | Taite .................... H04M 1/7253 455/41.1 |
| 2014/0208401 A1 | 7/2014 | Balakrishnan et al. |
| 2014/0279270 A1 | 9/2014 | Bertanzetti et al. |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2015/0032621 A1 | 1/2015 | Kar et al. |
| 2015/0120572 A1 | 4/2015 | Slade |
| 2015/0213474 A1 | 7/2015 | Howe |

OTHER PUBLICATIONS

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

QThru.com. "QThru: use your mobile smartphone for self-checkout." http://www.qthru.com/. QThru.com © 2011. 6 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/SB10001424052748703421204576329253050637400.html. 5 pages. Retrieved Mar. 22, 2013.

Office Action dated Aug. 27, 2015 for U.S. Appl. No. 14/175,701.

* cited by examiner

USER AUTHENTICATION BASED ON FOB/INDICIA SCAN

BACKGROUND

In order to access an application, authentication may be required. Authentication may be accomplished in a variety of formats depending upon the system or platform being accessed. For example, authentication may be accomplished using at least one of a personal identification number (PIN), an answer to a security question, a password, or biometric information. Applications that contain more sensitive information or functions usually require stricter authentication.

In addition to protecting secure content, authentication may be cumbersome to a user and require performing functions that are tedious in order to access data. There exists a need to provide non-cumbersome and reliable authentication for protecting sensitive information.

BRIEF SUMMARY

In some embodiments, an apparatus for authenticating a user. The apparatus comprises: a memory; a processor; and a module stored in memory, executable by the processor, and configured to: receive a request from a user for access to at least one function associated with a first application; determine that access to at least one function requires user authentication; initiate sensing of an authentication validating carrier comprising a first credential; determine the first credential from the sensed authentication validating carrier; validate the first credential, thereby resulting in a first successful user authentication; and grant access to the least one function associated with the first application based on the validation of the successful user authentication.

In some embodiments, the apparatus further comprises at least one sensor for sensing the authentication validating carrier and communicating information based on the authentication validating carrier to the processor; and wherein determining the first credential is based at least in part on the carrier information.

In some embodiments, the at least one sensor comprises a camera, the carrier information comprises an image of indicia, the sensor is for sensing and communicating the image of indicia to the processor, and determining the first credential comprises decoding the image of indicia, thereby resulting in the first credential.

In some embodiments, the at least one sensor comprises microphone, the carrier information comprises an encoded audio message, the at least one sensor is for sensing and communicating the encoded audio message to the processor, and determining the first credential comprises decoding the encoded audio message, thereby resulting in the first credential.

In some embodiments, the at least one sensor is a near field communication (NFC) reader, the carrier information comprises a signal comprising an encoded message emitted from a fob, the at least one sensor is for sensing and communicating the encoded message to the processor, and determining the credential is decoding the encoded message.

In some embodiments, the at least one sensor comprises short range data transceiver, the carrier information is a signal comprising an encoded message emitted by a short range transmitter, the at least on sensor is for sensing and communicating the encoded message to the processor, and determining the first credential comprises decoding the encoded message, thereby resulting in a first credential.

In some embodiments, the at least one sensor comprises an accelerometer, the carrier information comprises movement of the apparatus, the at least one sensor is for sensing and communicating the movement from the apparatus to the processor; and determining the first credential comprises analyzing the movement from the apparatus, thereby resulting in a first credential.

In some embodiments, the at least one sensor comprises a light sensor, the carrier information comprises a pulsed light signal, the at least on signal is for sensing and communicating the pulsed light signal, and determining the first credential comprises analyzing the pulsed light signal, thereby resulting in the first credential.

In some embodiments, the carrier information comprises a continuous stream of data, initiating sensing of the carrier information comprises a continuous process wherein the at least one sensor continuously senses and communicates the carrier information to the processor, and determining the first comprises continuously analyzing the first credential.

In some embodiments, the module is further configured to cause the processor to: receive a second credential from the user; validate the second credential, thereby resulting in a second successful user authentication; and wherein granting access to the at least one function associated with the first application is further based on the second successful user authentication.

In some embodiments, the second credential is at least one of a user name, a password, a passcode, and a personal identification number (PIN).

In some embodiments, the apparatus is further configured to: receive a second request from the user for access to at least one function associated with a second application; determine that access to at least one function associated with the second application requires user authentication; receive a second credential from the user; validate the second credential, thereby resulting in a second successful user authentication; and grant access to the at least one function associated with the second application based on the validation of the second successful user authentication.

In some embodiments, the access to at least one function associated with the first application expires after an occurrence of an expiration event and wherein the expiration event is at least one of a lapse of a period of time, an event associated with a third party application, an event associated with an operating system, and a user initiated event.

In some embodiments, the expiration of the at least one function associated with the first application is extended based at least in part on successfully validating the second credential.

In some embodiment, the number of times the expiration may be extended is limited as set by at least one of the user, the first application, the second application, a third party application, and an operating system.

In some embodiments, the apparatus is further configured to deny access to the at least one function associated with the first application if the second credential cannot be verified.

In some embodiments, the at least one function associated with the first application is a subset of the function associated with the second application.

In some embodiments, validating the first credential comprises: receiving an encrypted key from a remote server; decrypting the encrypted key from the remote server using a common key; encrypting the first credential using the decrypted key; sending the encrypted first credential to the remote server using a network connection; and receiving a message from the remote server indicating whether the first credential was effectively validated.

In some embodiments, a method for authenticating a user. The method comprises: receiving, by a computer processor, a request from a user for access to at least one function associated with a first application; determining, by a computer processor, that access to at least one function requires user authentication; initiating sensing, by a computer processor, an authentication validating carrier comprising a first credential; determining, by a computer processor, the first credential based at least in part on the sensed authentication validating carrier; validating, by a computer processor, the first credential, thereby resulting in a first successful user authentication; and granting access, by a computer processor, to the at least one function associated with the first application based at least in part on the first successful user authentication.

In some embodiments, a computer program product for authenticating a user, the product comprising: a non-transitory computer-readable medium comprising: a first set of codes for receiving a request from a user for access to at least one function associated with a first application; a second set of codes for determining that access to at least one function requires user authentication; a third set of codes for initiating sensing of an authentication validating carrier; a fourth set of codes for determining the first credential based at least in part on the sensed authentication validating carrier; a fifth set of codes for validating the first credential, thereby resulting in a first successful user authentication; and a sixth set of codes for granting access to at least one function associated with the first application based on the validation of the first successful user authentication.

BRIEF DESCRIPTION OF THE DRAWINGS

Figure 1A:
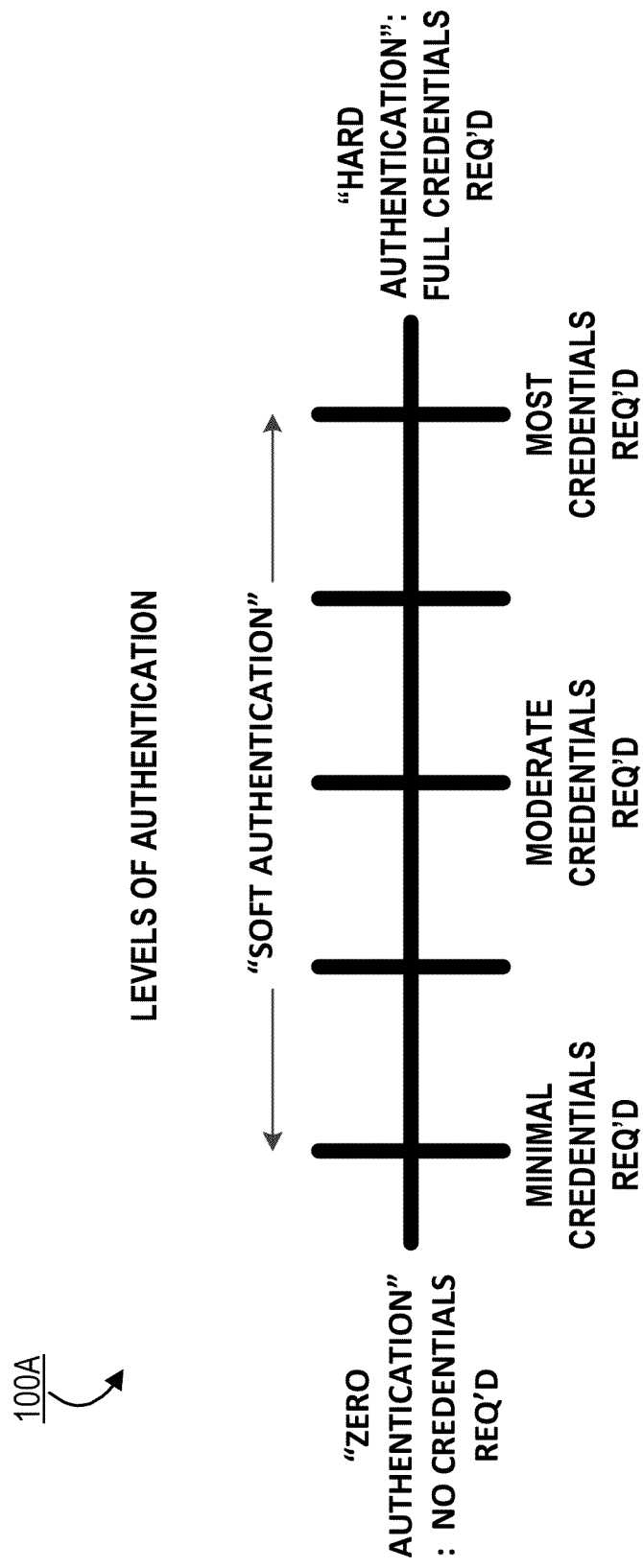
Figure 1B:
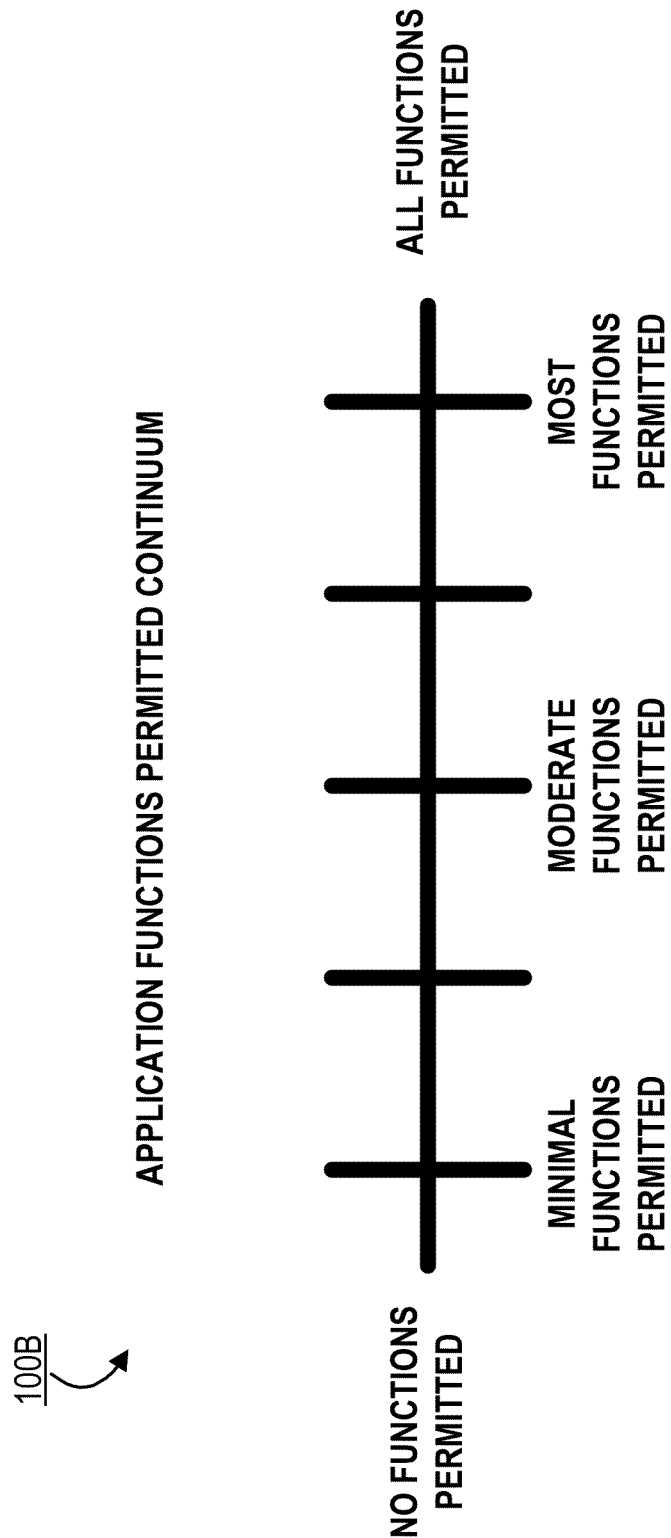
Figure 1C:
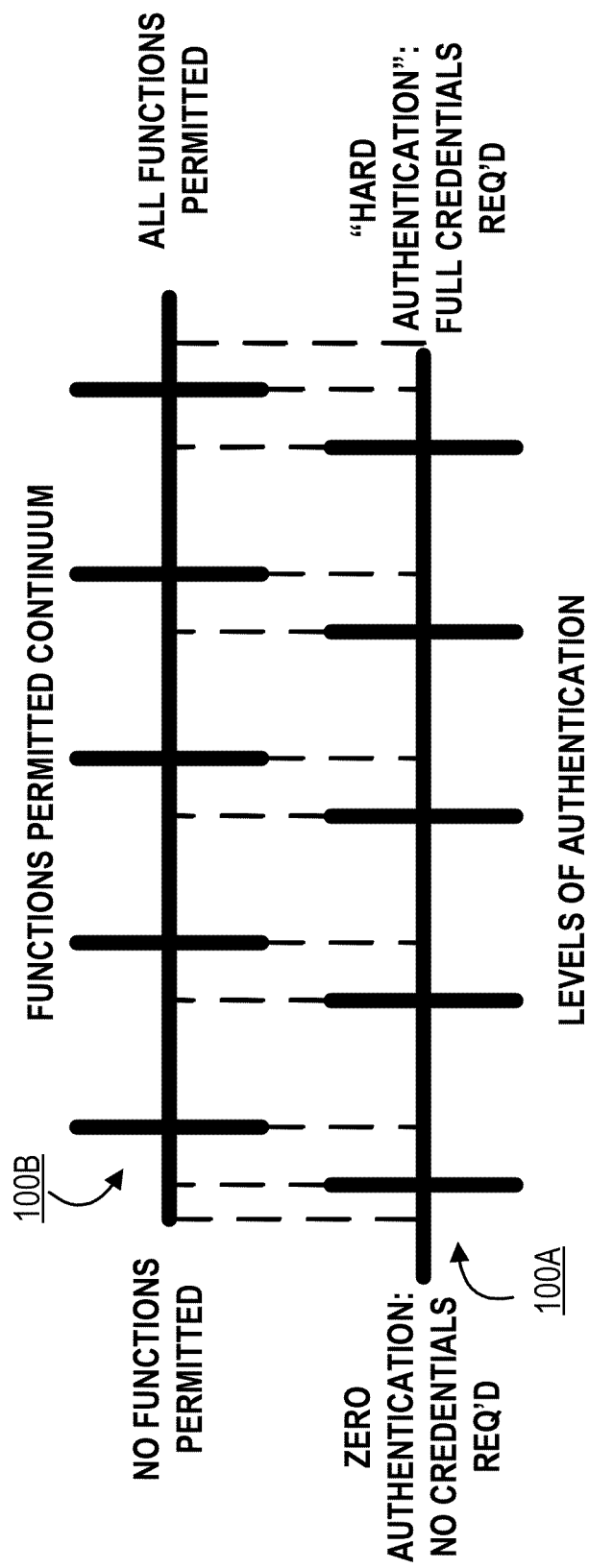
Figure 2:
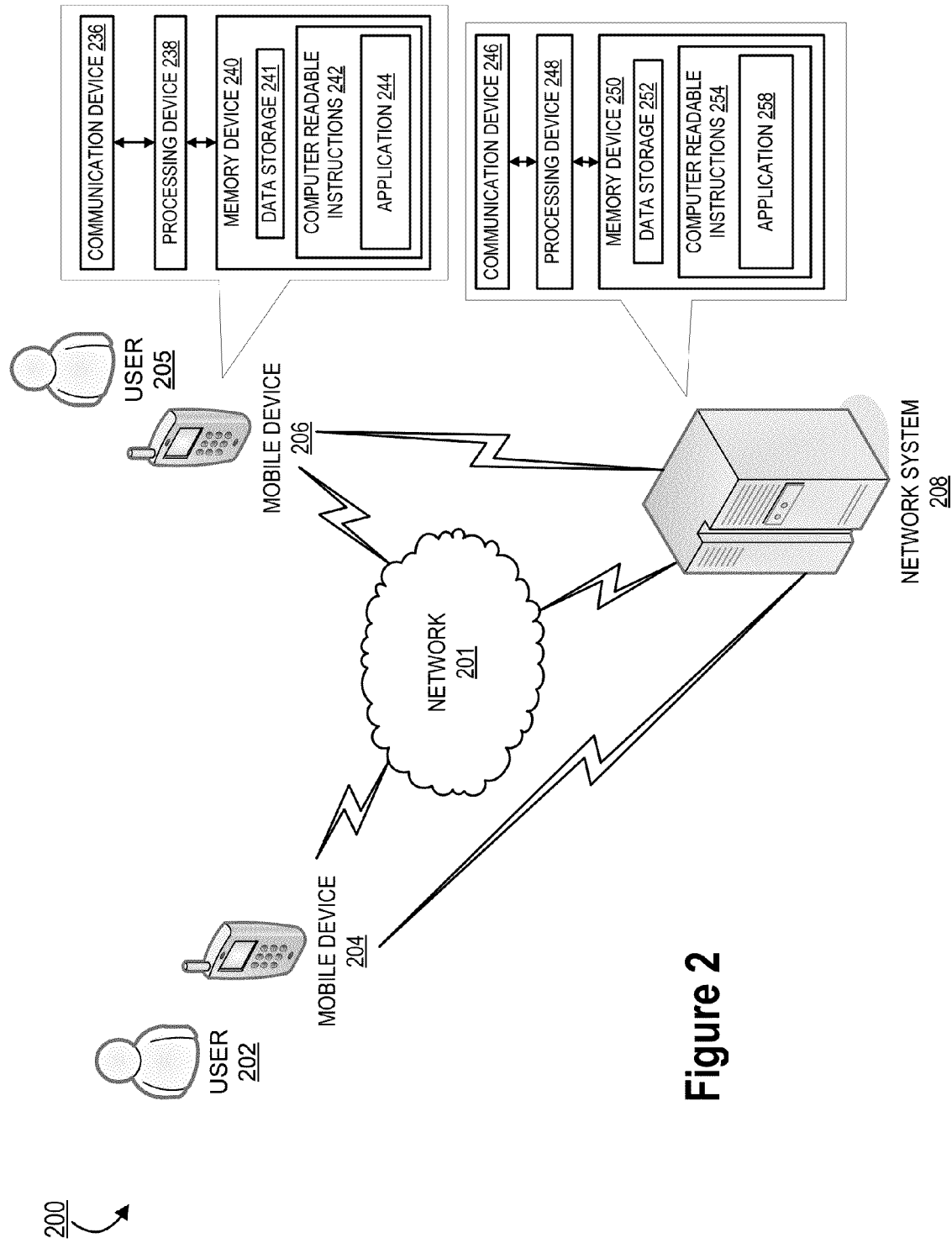
Figure 3:
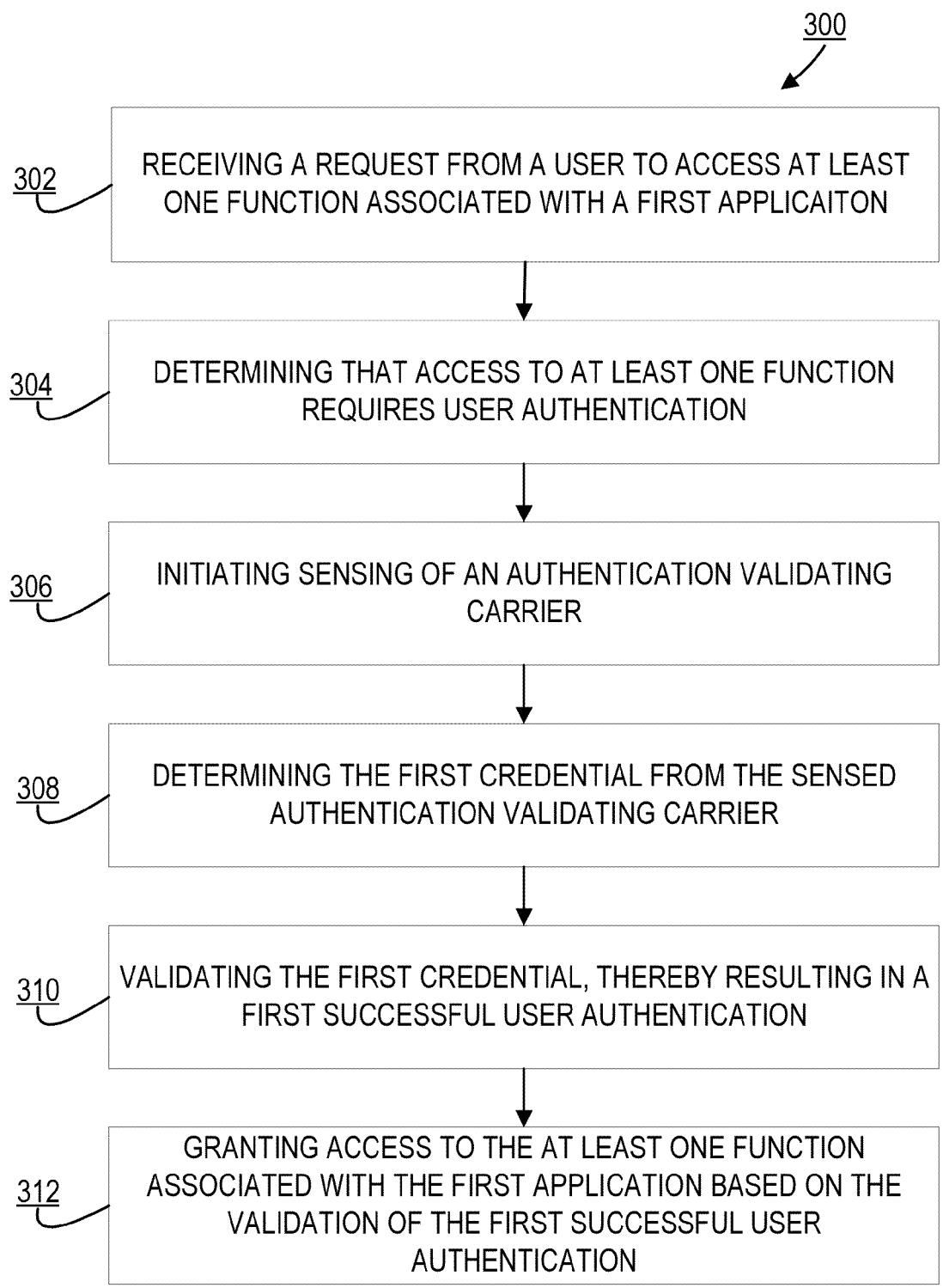

Having thus described embodiments of the invention in general terms, reference will now be made to the accompanying drawings, where:

FIG. 1A is an exemplary illustration of an authentication continuum, in accordance with embodiments of the present invention;

FIG. 1B is an exemplary illustration of an application function permission continuum, in accordance with embodiments of the present invention;

FIG. 1C is an exemplary illustration of the authentication continuum coupled with the application function permission continuum, in accordance with embodiments of the present invention;

FIG. 2 is a block diagram of an apparatus configured for authenticating a user; in accordance with embodiments of the present invention; and FIG. 3 is a flow diagram of a method for authenticating a user by sensing an authentication validating carrier comprising a first credential and validating the first credential; in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purpose of this invention, a "financial institution" may be defined as an organization, entity, or the like in the business of moving, investing, or lending money, dealing in financial instruments, or providing financial services. This may include commercial banks, thrifts, federal and savings banks, savings and loan associations, credit unions, investment companies, insurance companies and the like. In some embodiments, and "entity" may not be a financial institution.

User authentication may be required in a variety of situations. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 1A, a continuum of authentication 100A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, minimal credentials, moderate credentials or most credentials may be required for various points along the continuum. The continuum generally represents the number of credentials required and/or the relative strength of the credentials required for that point on the continuum. As discussed below with reference to FIG. 1C, the continuum of authentication 100A may be coupled with an application functions permitted continuum 100B, first illustrated in FIG. 1B.

Referring to FIG. 1B, the application functions permitted continuum 100B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 100B corresponds with a certain amount and/ or number of functions that are permitted and/or the context in which certain functions are permitted.

Referring now to FIG. 1C, a diagram 100C illustrates a coupling of the application functions permitted continuum 100B and the levels of authentication continuum 100A. As shown, the continua 100B and 100A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 100B provides that a particular function or functions may be permitted given that a specified level of authentication credentials are supplied, as indicated by the corresponding point on continuum 100A. For example, a financial institution and/or a user may arrange the continuua 100B and 100A with respect to one another and may adjust the arrangement based on changing desires or goals.

In some embodiments, one or both the continua 100B and 100A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 2, a network environment 200 is illustrated in accordance with one embodiment of the present invention. As illustrated in FIG. 2, the network system 208 is operatively coupled, via a network 201 to the mobile device 204 and/or 206. In this configuration, the network system 208 may send information to and receive information from the mobile device devices 204 and/or 206. The network system 208 may be or include one or more network base stations or other network components. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201.

In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258. The application 258 may perform a user authentication by performing one or more of the steps and/or sub-steps discussed herein.

As illustrated in FIG. 2, the mobile device 206 generally comprises a communication device 236, a processing device 238, and a memory device 240. The processing device 238 is operatively coupled to the communication device 236 and the memory device 240. In some embodiments, the processing device 238 may send or receive data from the mobile device 204, and/or the network system 208 via the communication device 236 over a network 201. As such, the communication device 236 generally comprises a modem, server, or other device for communicating with other devices on the network 201.

As further illustrated in FIG. 2, the mobile device 206 comprises computer-readable instructions 242 stored in the memory device 240, which in one embodiment includes the computer-readable instructions 242 of an application 244. In the embodiment illustrated in FIG. 2, the application 244 allows the mobile device 206 to be linked to the network system 208 to communicate, via a network 201. The application 244 may also allow the mobile device 206 to connect directly (i.e., locally or device to device) with the mobile device 204 for proximity services (e.g., using either cellular based links or non-cellular based links). The application 244 may perform a user authentication by performing one or more of the steps and/or sub-steps discussed herein.

It is understood that the servers, systems, and devices described herein illustrate one embodiment of the invention. It is further understood that one or more of the servers, systems, and devices can be combined in other embodiments and still function in the same or similar way as the embodiments described herein.

According to embodiments of the invention, systems and methods provide authentication to a set of functions associated with an application by sensing an authentication validating carrier.

Referring to FIG. 3, a flowchart illustrates a method 300 for authenticating a user, according to embodiments of the invention. The method provides authentication of a credential before granting access to at least one function associated with a first application. At block 302, the method 300 includes receiving a request from a user for access to at least one function associated with a first application.

At block 304, the method 300 includes determining that access to at least one function requires user authentication. Determining whether authentication is required may be dependent upon the type of functions and/or the type of information associated with the application. For instance, in cases where the information may be general knowledge, little or no authentication may be required such as viewing the time of day or the current weather conditions for a particular location. However, if the information is sensitive such as bank account information, stricter authentication may be required.

At block 306, the method 300 includes initiating sensing of an authentication validating carrier comprising a first credential. In some embodiments, the system may comprise at least one sensor for the purpose of sensing and communicating the authentication validating carrier to the processor. At least one of the sensors may be one of a camera, a global positioning system (GPS) receiver, a near field communication (NFC) reader, a microphone, an accelerometer, a finger print scanner, a short range transceiver, and a light sensor.

In some embodiments of the invention, the at least one sensor may be built into the apparatus and communicate directly with the processor. In other embodiments, the at least one sensor may be detached from the apparatus and communicate with the apparatus using a wired connection or a wireless connection. Where the communication between the at least one sensor and the apparatus is done via a wired connection, the communication may be done over a network connection.

At block 308, the method 300 includes determining the first credential based at least in part on the sensed authentication validating carrier. Depending on the sensor employed, the authentication validating carrier will vary in form. In some embodiments, the carrier may consist of a message encoded on a signal. While in other embodiments, the carrier may consist of physical movement. In any case, the carrier contains a first credential. In some embodiments, the apparatus may be configured to determine the credential at least in part on the carrier. In other embodiments, the apparatus may be configured to communicate the carrier to a remote service such as a remote server, wherein the remote service determines the first credential and returns the first credential to the apparatus. In yet other embodiments, the apparatus may display the carrier to the user and request that the user determine the first credential. For example, the carrier may be an image containing the first credential in the form of a set of pixels. The apparatus displays the image to the user and requests the user to identify the first credential by user selection. Upon the user selecting the appropriate set of pixels, the first credential would be communicated to the apparatus. In yet another embodiment, the carrier may be an audio message and determining the first credential may comprise utilizing a voice recognition module to interpret the message.

At block 310, the method 300 includes validating the first credential, thereby resulting in a first successful user authentication. In some embodiments, the apparatus may be configured to validate the credential using credentials that have been stored in memory previously. In other embodiments, the apparatus may be configured to communicate the first credential to a remote service, such as a remote server, wherein the remote service contains the credentials necessary to validate the first credential. Upon validating the first credential, the remote service communicates a reply to the apparatus indicating whether the credential was properly validated. Additionally, if the first credential is communicated to a remote service, the apparatus may be configured to encrypt the first credential using a common encryption key shared between the apparatus and the remote service before communicating said credential to the remote service. Further, the encryption may be based at least in part on an encrypted key sent from the remote service to the apparatus where on the apparatus decrypts the key using a shared key and encrypts the first credential before sending the first credential to the remote service for validation.

In some embodiments, the at least one sensor may comprise a camera and the authentication validating carrier would be an indicia with an embedded message. The indicia may comprise at least one of a signature, a QR code, a bar code, an encoded image, a textual image, and a biometric feature. The first credential may be obtained by decoding the image of indicia, thereby resulting in a first credential.

In some embodiments, the at least one sensor may comprise a microphone and the authentication validating carrier is an audio signal which comprises an encoded audio message. The first credential may be obtained by decoding the audio message, thereby resulting in the first credential.

In some embodiments, the at least one sensor may comprise an NFC reader. The authentication validating carrier may comprise a signal comprised of an encoded message emitted from a fob or another magnetic transmission device. The first credential may be obtained by decoding the encoded message, thereby resulting in the first credential. An example of this embodiment could be a credit card with an embedded NFC emitter to form a "smart card" which emits a signal. A mobile device could include a NFC reader and the device configured to sense the emitted from the "smart card". The mobile device could further be configured to analyze the signal in order to obtain a credential.

In some embodiments, the at least one sensor may comprise a short range data transceiver. The authentication validation carrier may comprise a signal containing an embedded message emitted from a short range data transmitter. In other embodiments, the apparatus is further configured to send a request to the short range data transmitter via the short range data transceiver, where upon the short range data transmitter will process the request and send back a response to the apparatus. The apparatus will receive the response via the short range data transceiver. In yet further embodiments, either or both the request and response may be encrypted.

An example of this embodiment could be a short range data transmitter embedded into a key chain device. The embedded device could be configured to emit a wireless signal containing a credential wherein the emission may be a result from a user pressing a button located on the key chain device. A mobile device could include a short range data transceiver and the device configured to sense the signal emitted from the key chain device. The mobile device could further be configured to analyze the signal to obtain the credential from the signal. Additionally, the mobile device could further be configured to communicate a request to the key chain device and the key chain device configured to emit the signal containing the credential upon receiving the request. In yet another embodiment, the key chain device could include a low power emitter that continuously emits the signal containing the credential.

In some embodiments, the at least one sensor may comprise an accelerometer. The authentication validating carrier may comprise movement of the apparatus. The first credential may be obtained by analyzing the movement of the apparatus, thereby resulting in a first credential. For example, a user may carry a mobile device with an attached accelerometer configured to sense motion of the mobile device. The mobile device could be further configured to record, using the accelerometer, the user's gate as the user carried the mobile device and performed a walking motion in order to determine a first credential at least in party upon the recorded gate. The mobile device could validate the first credential, thereby resulting in a successful authentication. Based upon at the least the authentication, the mobile device could grant access to the user to access to at least one function associated with an application.

In some embodiments, the at least one sensor may comprise a light sensor. The authentication validating carrier may comprise a pulsed light signal. The first credential may be obtained by analyzing the pulsed light signal, thereby resulting in the first credential.

In one embodiment of the invention, more than one sensor may be used in order to sense the authentication validating carrier. Where more than one sensor is employed, the apparatus may be configured to sense the authentication validating carrier using multiple sensors at the same time. Additionally, the authentication validating carrier may consist of multiple observations wherein at least one sensor may be employed to sense each observation of the carrier. In such a case, one embodiment may be configured to employ the sensors to sense the multiple observations at the time same time.

In other embodiments, when the authentication validating carrier consists of multiple observations and multiple sensors are employed to measure the multiple observations, the observations may occur at different time periods. Further, the occurrence of one observation may be dependent upon the occurrence of at least one previous observation.

In other embodiments, where the apparatus comprises multiple sensors and the apparatus is configured to sense multiple authentication validating events, the apparatus may be configured to randomly select a particular authentication validating carriers to sense at a given time. In yet other embodiments, the apparatus may allow the user to select one of multiple authentication validating carriers. For example, the apparatus may comprise a camera and a NFC reader and is configured to sense an image of indicia containing an embedded message and a signal containing an embedded message being emitted from a fob. The apparatus presents a user with an option to either use the camera to sense the image of indicia or to use the NFC reader to sense the signal emitted from the fob.

Further, where the apparatus comprises multiple sensors and the apparatus is configured to sense multiple authentication validating events, the first application may comprise of more than one function wherein the functions may have comprise different levels of sensitivity. The apparatus may be configured to require different authentications based upon the function requested associated with the first application.

For example, a bank application may contain the functionality to view a bank statement, transfer funds between accounts, and pay a bill. A mobile device could comprise a camera and an NFC reader. The device could further be configured to sense an image containing an embedded message using the camera and a signal emitted from a fob using the NFC reader. The device could be configured to require a credential be obtained and authorized by sensing the image with the embedded message prior to granting access to view the bank statement. The device could be further be configured to require a credential to be obtained and authorized by sensing the message emitted from the fob prior to granting access to transfer funds between accounts, or pay a bill.

At block 312, the process includes granting access to the at least one function associated with the first application based on the validation of the first successful user authentication. In some embodiments, granting access based upon the first successful user authentication may be limited to a subset of the functions associated with the first application. Further, in other embodiments, the grant may also be limited to a period of time upon the expiration of which the grant is removed until a successful validation is once again performed.

In some embodiments, the method for authenticating a user may be continuous wherein, the apparatus is configured to continuously sense the authentication validating carrier, determine the first credential, validate the first credential, and grant access to the at least one function associated with a first application based upon the continuous validation. In other embodiments, after a user has been granted access to the at least one function associated with the first application, if the first credential fails to be validated, the apparatus may be further configured to terminate access to the at least one function associated with the first application.

In some embodiments, the apparatus may be further configured to receive a second credential from the user and validate the second credential, thereby resulting in a second successful user authentication. Granting access to the at least one function associated with the first application may also be dependent at least in part on the second successful user authentication. In some embodiments, the second user authentication may be at least of a username, a password, a password, and a personal identification number (PIN).

For example, a user may desire to gain access to a functions associated with a mobile banking application located on a mobile device with a built in NFC reader. The user may carry a fob that emits a first authentication validating carrier containing the first credential. The user could use the NFC reader on the mobile device to scan the fob, thereby causing the mobile device to receive the authentication validating carrier. After the mobile device successfully determines and validates the first credential from the first authentication validating carrier, the device could prompt the user to submit a second credential to the mobile device, such as submitting a password or a pin. Upon the mobile device receiving the second credential from the user, the mobile device could validate the second credential, thereby resulting in a successful authentication. Based on the successful authentication, the mobile device could grant access to the user to the functions associated with the mobile banking application.

In some embodiments, the apparatus may further be configured to prompt the user to submit a particular second credential based at least in part upon the first credential. For example, a user could use a camera attached to a mobile device to take a picture of QR code wherein the QR code has an embedded message. The first credential may be one of many different messages and depending upon the message received, the mobile device would request one of several different secondary credentials. For instance, where one message is received, the device would request a pin code, and where a second message is received, a password. This may be based at least upon the level of security of the function being requested.

In some embodiments, the process may further be configured to receive a request from the user for access to at least one function associated with a second application and determine that access to at least one function associated with the second application required user authentication. Then, the processor may receive a second credential from the user and validate the second credential, thereby resulting in a second successful user authentication. Finally, the processor may grant access to the at least one function associated with the second application based on the validation of the second successful user authentication. The request to access the second application may occur before or after the request to access the first authentication. The successful authentication of the first credential may be a prerequisite to requesting access to the at least one function associated with the second transaction. The second application may also be the same as the first application and the functions associated with the second application may be a subset of the functions associated with the first application.

The access to at least one function associated with the first application may be terminated upon the occurrence of an expiration event. The expiration event may be a result of an action taken by at least one of the user, a lapse of a period of time, an event associated with a third party application, and an event associated with an operating system. After the occurrence of the expiration event, the system will require validation of the first credential in order to grant access to the user for at least one function associated with a first application. The expiration of the first credential may be extended upon the authentication of the second credential. For example, the expiration of the first credential may be based upon a lapse of a period of time. Upon successful authentication of the second credential, the lapse of the period of time will be extended to a time past the original expiration. The number of times that an expiration event is extended may be limited to a predetermined amount.

In some embodiments, the system may be configured to deny a user access to at least one function associated with the first application if the second credential fails authentication. After the second credential fails authentication, the user may not be allowed access until the successful authentication of the first credential.

In some embodiments of the invention, the system may be configured to limit sensing of the validating authentication event to specific period of time. The period of time may be a preset length of time or may be a set period between two times. Where the period of time is a preset length of time, the system may be configured to track the amount of time a credential has been authenticated. Further, the system may be configured to prevent sensing the authenticating validation event after the tracked time has exceeded the preset length of time. The system may also be configured to terminate user access to the at least one function associated with the first application upon the tracked time exceeding the preset time period. In the even the period of time is a set period between two times, the system may be configured to prevent sensing of the authentication validating event if a request to access the at least one function occurs outside of the set periods of time. The system may be configured to terminate user access to the at least one function associated with the first application if time in which the credential is authenticated occurs outside of the set periods of time.

In some embodiments, the system may be configured to set a lock out period before a sensing event may be initiated upon an unsuccessful prior attempt to authenticate a credential. Further, the lock out period may vary in length depending upon the number of unsuccessful consecutive authentication attempts or the number of unsuccessful authentication attempts within a given period of time. For example, if the system fails to authenticate, a lock out period may result. If the user successfully authenticates and then unsuccessfully authenticates within a predetermined period of time, a longer lockout period may occur.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

In various embodiments, the level of user authentication may also be based in part on validating an identity of the mobile device of the user. Such verification can be incorporated into the close network score or into a unique identity score that is combined with the close network score in order to determine the appropriate level of authentication required for a requested action/function. The identity of the mobile device may be determined in a variety of ways. For example, a particular mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the mobile device.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| U.S. patent application Ser. No. | Title | Filed On |
| --- | --- | --- |
| 14/175,639 (now published as U.S. patent application Publication No. 2015/0227926) | DETERMINING USER AUTHENTICATION REQUIREMENTS BASED ON THE CURRENT LOCATION OF THE USER IN COMPARISON TO A USERS'S TRAVEL ROUTE | Concurrently Herewith |
| 14/175,643 (now published as U.S. patent application Publication No. 2015/0227727) | DETERMINING USER AUTHENTICATION REQUIREMENTS BASED ON THE CURRENT LOCATION OF THE USER IN COMPARISON TO THE USERS'S NORMAL BOUNDARY OF LOCATION | Concurrently Herewith |
| 14/175,646 (now published as U.S. patent application Publication No. 2015/0227728) | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Concurrently Herewith |
| 14/175,701 (now published as U.S. patent application Publication No. 2015/0229623) | USER AUTHENTICATION BASED ON HISTORICAL TRANSACTION DATA | Concurrently Herewith |
| 14/175,947 (now published as U.S. patent application Publication No. 2015/0229624) | USER AUTHENTICATION BASED ON HISTORICAL USER BEHAVIOR | Concurrently Herewith |
| 14/175,954 (now | USER AUTHENTICATION | Concurrently |

-continued

| U.S. patent application Ser. No. | Title | Filed On |
|---|---|---|
| published as U.S. patent application Publication No. 2015/0229650) | BY GEO-LOCATION AND PROXIMITY TO USER'S CLOSE NETWORK | Herewith |
| 14/175,863 (now published as U.S. patent application Publication No. 2015/0227731) | USER AUTHENTICATION BASED ON OTHER APPLICATIONS | Concurrently Herewith |
| 14/175,688 (now published as U.S. patent application Publication No. 2015/0227730) | USER AUTHENTICATION BASED ON SELF-SELECTED PREFERENCES | Concurrently Herewith |
| 14/175,672 (now published as U.S. patent application Publication No. 2015/0227729) | SELF-SELECTED USER ACCESS BASED ON SPECIFIC AUTHENTICATION TYPES | Concurrently Herewith |
| 14/175,136 (now published as U.S. patent application Publication No. 2015/0229622 | SHUTTING DOWN ACCESS TO ALL USER ACCOUNTS | Concurrently Herewith |
| 14/175,146 (now published as U.S. patent application Publication No. 2015/0227725) | PROVIDING AUTHENTICATION USING PREVIOUSLY-VALIDATED AUTHENTICATION CREDENTIALS | Concurrently Herewith |
| 14/175,652 (now published as U.S. patent application Publication No. 2015/0227924) | DETERMINING AUTHENTICATION REQUIREMENTS ALONG A CONTINUUM BASED ON A CURRENT STATE OF THE USER AND/OR THE SERVICE REQUIRING AUTHENTICATION | Concurrently Herewith |
| 14/175,956 (now published as U.S. patent application Publication No. 2015/0227724) | SORTING MOBILE BANKING FUNCTIONS INTO AUTHENTICATION BUCKETS | Concurrently Herewith |
| 14/175,962 (now published as U.S. patent application Publication No. 2015/0229625) | AUTHENTICATION LEVEL OF FUNCTION BUCKET BASED ON CIRCUMSTANCES | Concurrently Herewith |
| 14/175,771 (now published as U.S. patent application Publication No. 2015/0227903) | REMOTE REVOCATION OF APPLICATION ACCESS BASED ON LOST OR MISAPPROPRIATED CARD | Concurrently Herewith |
| 14/175,786 (now published as U.S. patent application Publication No. 2015/0227927) | REVOCATION OF APPLICATION ACCESS BASED ON NON-CO-LOCATED | Concurrently Herewith |

What is claimed is:

1. An apparatus for authenticating a user, the apparatus comprising:
a memory;
a processor;
at least one sensor for continuously sensing an authentication validating carrier and communicating carrier information based on the authentication validating carrier to the processor, wherein the carrier information comprises a continuous stream of data; and
a module stored in the memory, executable by the processor, and configured to cause the processor to:
receive a first request from a user to access at least one first function associated with a first application;
determine that access to the at least one first function requires user authentication;
initiate sensing of the authentication validating carrier comprising a first credential, wherein initiating sensing of the authentication validating carrier comprises a continuous process;
determine the first credential based at least in part on the sensed authentication validating carrier, wherein determining the first credential is based at least in part on the carrier information, wherein determining the first credential comprises continuously analyzing the stream of data thereby resulting in the first credential;
validate the first credential, thereby resulting in a first successful user authentication; and
grant access to the at least one first function associated with the first application based at least in part on the first successful user authentication.

2. The apparatus of claim 1, wherein the at least one sensor comprises a camera;
wherein the carrier information comprises an image of indicia;
wherein the sensor is for sensing and communicating the image of indicia to the processor; and
wherein determining the first credential comprises decoding the image of indicia, thereby resulting in the first credential.

3. The apparatus of claim 1, wherein the at least one sensor comprises a microphone;
wherein the carrier information comprises an encoded audio message;
wherein the sensor is for sensing and communicating the encoded audio message to the processor; and
wherein determining the first credential comprises decoding the encoded audio message, thereby resulting in the first credential.

4. The apparatus of claim 1, wherein the at least one sensor is a near field communications (NFC) reader;
wherein the carrier information comprises a signal comprised of an encoded message emitted from a fob;
wherein the at least one sensor is for sensing and communicating the signal from the fob to the processor; and
wherein determining the first credential comprises decoding the encoded message, thereby resulting in the first credential.

5. The apparatus of claim 1, wherein the at least one sensor comprises a short range data transceiver;
wherein the carrier information comprises a signal comprised of an encoded message emitted from a short range data emitter;
wherein the at least one sensor is for sensing and communicating the signal from the short range data emitter to the processor; and
wherein determining the first credential comprises decoding the encoded message, thereby resulting in the first credential.

6. The apparatus of claim 1, wherein the at least one sensor comprises an accelerometer;
wherein the carrier information comprises movement from the apparatus;
wherein the at least one sensor is for sensing and communicating the movement from the apparatus to the processor; and
wherein determining the first credential comprises analyzing the movement from the apparatus thereby resulting in the first credential.

7. The apparatus of claim 1, wherein the at least one sensor comprises a light sensor;

wherein the carrier information comprises a pulsed light signal;
wherein the at least one sensor is for sensing and communicating the pulsed light signal to the processor;
wherein determining the first credential comprises analyzing the pulsed light signal thereby resulting in the first credential.

8. The apparatus of claim 1, wherein the first application comprises more than one function;
wherein the apparatus comprises more than one sensor and is configured to sense more than one authentication validating carrier;
wherein the functions associated with the first application comprise different levels of sensitivity;
wherein, the apparatus is configured to obtain and authenticate a specific authentication validating carrier depending on the first request.

9. The apparatus of claim 1, wherein the module is further configured to cause the processor to:
receive a second credential from the user;
validate the second credential, thereby resulting in a second successful user authentication; and
wherein granting access to the at least one first function associated with the first application is further based at least in part on the second successful user authentication.

10. The apparatus of claim 1, wherein the module is further configured to cause the processor to:
receive a second request from the user for access to at least one second function associated with a second application;
determine that access to at least one second function associated with the second application requires user authentication;
receive a second credential from the user;
validate the second credential, thereby resulting in a second successful user authentication; and
grant access to the at least one second function associated with the second application based on the second successful user authentication.

11. The apparatus of claim 10, wherein the access to at least one first function associated with the first application expires after an occurrence of an expiration event; and
wherein the expiration event is at least one of a lapse of a period of time, an event associated with a third party application, an event associated with an operating system, and a user-initiated event.

12. The apparatus of claim 11, wherein the expiration of the at least one first function associated with the first application is extended based at least in part on successfully validating the second credential.

13. The apparatus of claim 12, wherein the number of times the expiration may be extended is limited as set by at least one of the user, the first application, the second application, a third party application, and an operating system.

14. The apparatus of claim 11, wherein the apparatus is further configured to deny access to the at least one first function associated with the first application if the second credential cannot be verified.

15. The apparatus as of claim 10, wherein the at least one first function associated with the first application is a subset of functions of the at least one second function associated with the second application.

16. The apparatus of claim 1, wherein validating the first credential comprises:
receiving an encrypted key from a remote server;
decrypting the encrypted key from the remote server using a common key;
encrypting the first credential using the decrypted key;
sending the encrypted first credential to the remote server using a network connection; and
receiving a message from the remote server indicating whether the first credential was effectively validated.

17. A method for authenticating a user, the method comprising:
receiving, by a computer processor, a request from a user to access at least one first function associated with a first application;
determining, by a computer processor, that access to the at least one first function requires user authentication;
initiating sensing, by a computer processor using a sensor, of an authentication validating carrier comprising a firsts credential, the sensor being configured to continuously sense the authentication validating carrier and communicate carrier information based on the authentication validating carrier to the processor, wherein the carrier information comprises a continuous stream of data, wherein initiating sensing of the authentication validating carrier comprises a continuous process;
determining, by a computer processor, the first credential based at least in part on the sensed authentication validating carrier, wherein determining the first credential is based at least in part on the carrier information, wherein determining the first credential comprises continuously analyzing the stream of data thereby resulting in the first credential;
validating, by a computer processor, the first credential, thereby resulting in a first successful user authentication; and
granting access, by a computer processor, to the at least one first function associated with the first application based at least in part on the first successful user authentication.

18. A computer program product for authenticating a user, the computer program product comprising:
a non-transitory computer-readable medium comprising:
a first set of codes for receiving a request from a user for access to at least one first function associated with a first application;
a second set of codes for determining that access to the at least one first function requires user authentication;
a third set of codes for initiating sensing, using a sensor, of an authentication validating carrier comprising a first credential, the sensor being configured to continuously sense the authentication validating carrier and communicate carrier information based on the authentication validating carrier to the processor, wherein the carrier information comprises a continuous stream of data, wherein initiating sensing of the authentication validating carrier comprises a continuous process;
a fourth set of codes for determining the first credential based at least in part on the sensed authentication validating carrier, wherein determining the first credential is based at least in part on the carrier information, wherein determining the first credential comprises continuously analyzing the stream of data thereby resulting in the first credential;
a fifth set of codes for validating the first credential, thereby resulting in a first successful user authentication; and
a sixth set of codes for granting access to the at least one first function associated with the first application based at least in part on the successful user authentication.

* * * * *